Patented Oct. 3, 1939

2,174,756

UNITED STATES PATENT OFFICE 2,174,756

PRODUCTION OF UNSATURATED ALIPHATIC OR CYCLOALIPHATIC CARBOXYLIC ACID NITRILES

Kurt Pieroh, Ludwigshafen-on-the-Rhine, Germany, assignor to I. G. Farbenindustrie Aktiengesellschaft, Frankfort-on-the-Main, Germany No Drawing. Application February 5, 1938, Serial No. 188,933. In Germany September 4, 1934

5 Claims. (Cl. 260—464)

The present application is a continuation-in-part of my copending application Ser. 38,792, filed on August 31, 1935, which relates to the production of unsaturated aliphatic or cycloaliphatic carboxylic acid nitriles.

I have found that unsaturated aliphatic carboxylic acid nitriles can be prepared in a very advantageous manner by splitting off hydrogen halide from halogen-containing saturated aliphatic carboxylic acid nitriles by heating them at a temperature above 250° C., preferably in the presence of a substance being capable of splitting off hydrogen halide.

Substances of the said kind are particularly surface active catalysts, such as for example silica gel, aluminum oxide, titanium oxide, barium chloride, active carbon, silicic acid and the like. Furthermore suitable substances capable of splitting off hydrogen halide are for example small pieces of earthenware, quartz, glass or silicic acid on which graphite has been precipitated. The process is carried out for example by treating the halogen-containing saturated aliphatic carboxylic acid nitriles in the presence of the said substances at temperatures between 250° and 600° C. The most favorable working temperature is between 400° and 550° C. The saturated carboxylic nitriles may be subjected to the process in gaseous or liquid state. In many cases it is advantageous to increase the velocity of the current of the gases by working under diminished pressure or by the admixture of indifferent gases, such as nitrogen. It may also be advantageous to regulate the velocity of the current of the gases in such a manner that only a splitting off of hydrogen halide is effected in a certain degree. In this case the unsaturated nitrile is removed from the unchanged halogen-containing carboxylic nitrile by distillation. The removal of the hydrogen halides split off is effected by washing the reaction product with water.

For example the process may be carried out with special advantage in the following manner: A saturated carboxylic acid is converted into the corresponding carboxylic acid nitrile by treating it with ammonia in the presence of a catalyst. The resulting carboxylic acid nitrile is then halogenated and the halogenated carboxylic acid nitrile is heated preferably in the presence of a substance being capable of splitting off hydrogen halide. Often it is advantageous to treat the saturated carboxylic acids first with halogen in such a manner that halogen-containing carboxylic acids are obtained and then to react the said halogenated carboxylic acids with ammonia at such conditions that the corresponding halogen-containing carboxylic acid nitrile is formed from which the unsaturated carboxylic acid nitrile is obtained by splitting off hydrogen halide.

The following examples will further illustrate the nature of the present invention, but the invention is not restricted to these examples. The parts are by weight.

Example 1

A chlorination product of isobutyric acid nitrile which mainly consists of monochlorides of isobutyronitrile is led under reduced pressure over a catalyst consisting of titanium dioxide at between about 400° and 550° C. A mixture consisting of methacrylic acid nitrile and chlorisobutyric acid nitrile separating off in the strongly cooled receiver is obtained. By fractional distillation of the said mixture pure methacrylic acid nitrile boiling between 90° and 92° C. is recovered in a good yield.

Example 2

A mixture of 200 parts of isobutyric acid and 44 parts of ammonia is passed per hour at 380° C. through a contact pipe charged with 400 parts of silica gel. In the receiver the reaction product separates in two layers the top layer of which consisting of almost pure isobutyric acid nitrile. The degree of conversion amounts to over 90 per cent calculated with reference to the amounts of the isobutyric acid employed. By evaporation small amounts of isobutyric acid amide and ammonium isobutyrate may be obtained from the bottom layer and be subjected to a dehydration in order to obtain the corresponding nitrile. By a single distillation a product is obtained boiling between 103° and 104° C.

Into 138 parts of the isobutyronitrile chlorine is led with access of sunlight until the increase of weight amounts to about 40 parts, the temperature being kept at from 45° to 65° C. by cooling. The chlorination is stopped when the product has a boiling temperature beginning at 115° C., i. e. when practically no longer unchanged isobutyronitrile is present. The chlorination product consists of a mixture of the mono chlorides of isobutyronitrile besides a small amount of higher chlorination products and hydrogen halide dissolved in the mixture. It has an average content of chlorine of about 36 per cent and boils between 115° and 175° C. The product is then led in vapor state through a tube of quartz containing titanium dioxide as catalyst. The reaction products leaving the tube are cooled and washed with water. Thus methacrylic nitrile, which contains small amounts of chlorination proucts is obtained in a very good yield. By heating the aqueous washing liquid a small amount of methacrylic nitrile can be obtained.

Example 3

The chlorination product of isobutyronitrile obtained according to Example 2 is subjected to a distillation at atmospheric pressure. The fraction distilling between 115° and 120° C. which has a content of chlorine of 34 per cent and which represents practically pure monochlorisobutyric nitrile is led at 540° C. through a tube, having 1 meter in length and about 25 millimeters in diameter, charged with 100 cubic centimeters of quartz in the form of small pieces. The monochlorisobutyric nitrile is supplied at such a rate that the hourly flow of the nitrile through the tube amounts to 75 grams. The reaction product obtained is cooled and led into water. The working up of the reaction product is carried out in the manner described in Example 2. Thus methacrylic nitrile is obtained in a high yield.

What I claim is:

1. The process for the production of an unsaturated aliphatic carboxylic acid nitrile which comprises heating a halogen-containing saturated aliphatic carboxylic acid nitrile containing four carbon atoms at a temperature above 250° C.

2. The process for the production of an unsaturated aliphatic carboxylic acid nitrile which comprises heating a halogen-containing saturated aliphatic carboxylic acid nitrile containing four carbon atoms at a temperature above 250° C. in the presence of a substance being capable of splitting off hydrogen halide.

3. The process for the production of an unsaturated aliphatic carboxylic acid nitrile which comprises heating a halogen-containing saturated aliphatic carboxylic acid nitrile containing four carbon atoms at a temperature above 250° C. in the presence of a surface active catalyst being capable of splitting off hydrogen halide.

4. The process for the production of an unsaturated aliphatic carboxylic acid nitrile which comprises leading a halogen-containing saturated aliphatic carboxylic acid nitrile containing four carbon atoms at a temperature above 250° C. in the gaseous state over a surface active catalyst being capable of splitting off hydrogen halide.

5. The process for the production of an unsaturated aliphatic carboxylic acid nitrile which comprises leading the monochloride of isobutyric nitrile under reduced pressure at a temperature between 400° and 550° C. over a surface active catalyst being capable of splitting off hydrogen halide.

KURT PIEROH.